3,811,984
METHOD FOR PREPARING TUBULAR THERMOPLASTIC FILAMENTS
Paul Joonase, 23 E. Earle St., Greenville, S.C. 29609
Original application Apr. 3, 1970, Ser. No. 29,381, now abandoned. Divided and this application Dec. 16, 1971, Ser. No. 209,002
Int. Cl. B32b 31/00
U.S. Cl. 156—251                5 Claims

ABSTRACT OF THE DISCLOSURE

According to the invention, superior filaments having beaded edges and which are suitable for twisting and weaving are prepared from thermoplastic film by severing the film with flame as it is selectively cooled while passing over a cooled, grooved roll. Alternately, the film may be cooled and the flame selectively applied as with a gas flame fitted with a slitted heat shield. By using a double wound film, tubular filaments are prepared when the film is heat severed and the edges of two or more filaments fuse together.

---

This is a division of application Ser. No. 29,381, filed Apr. 3, 1970, now abandoned.

This invention releates generally to filaments of thermoplastic material and a method and apparatus for preparing same. Specifically, the invention relates to filaments prepared from sheets of flexible, thermoplastic polymer film.

Conventional methods of preparing filaments of thermoplastic material include mechanically cutting a sheet of thermoplastic film or extrusion of a filament from molten material. However, mechanical cutting produces a strip or filament which is not suitable for twisting or weaving; and extrusion is a high-cost, low-speed process that is not economically advantageous. Also, in neither of these methods is there a way to color or decorate the filaments that is relatively free of difficulty. Accordingly, it is an object of the present invention to prepare filaments which may be decorated with either coloring pigments or metallic particles.

It is another object of this invention to produce a filament of thermoplastic material which is strong and resists wearing and tearing.

Another object of the invention is to produce a filament of thermoplastic material which is suitable for twisting or weaving.

A further object of the invention is to provide an economical and high-speed method of producing filaments from thermoplastic material.

Yet another object of the invention is to provide a method for producing a tubular filament.

Still another object of the invention is to eliminate the warping a spooling steps in the weaving of fabric by winding the filament on a beam which can be used directly in a loom.

These and other objects are achieved by the present invention in which a heat source is used to sever flexible thermoplastic film into strips while the film is being cooled. The heat source can be selectively applied to cooled film or heat can be generally applied to the film which is being selectively cooled. The heat must be sufficient to reach the melting temperature of the particular film, but not so great as to burn the film. In melting, a bead is produced on the edges of the filament which resists tearing and gives the filament added strength for twisting and weaving. By using a double sheet of thermoplastic material and severing the two sheets with heat as the sheets are cooled in contact with each other, the edges of the filaments produced in one sheet fuse together with the edges of the filaments in the second sheet thereby forming a tubular filament of double strength. A metallized surface can be protected from abrasion or scraping in this manner or the tubular filament can be filled with coloring pigment. The invention may be better understood by reference to the following detailed description and drawings in which:

Figure 1:
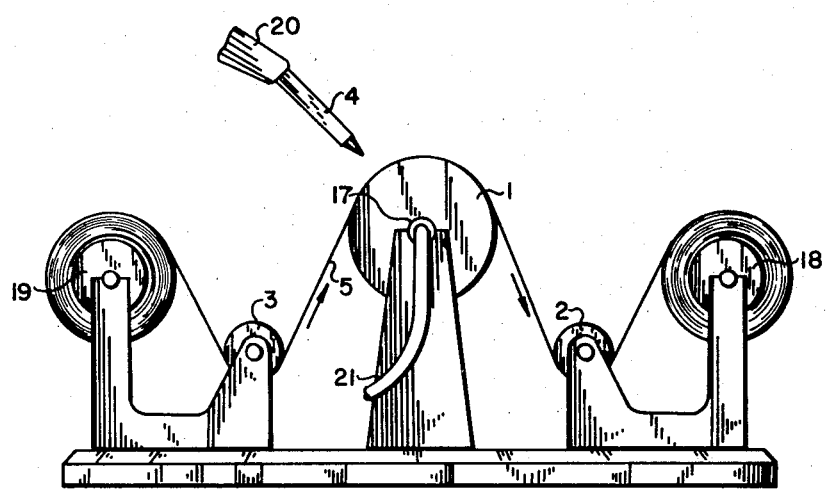
FIG. 1 is a diagrammatic representation of one embodiment of the apparatus of the present invention.
Figure 2:
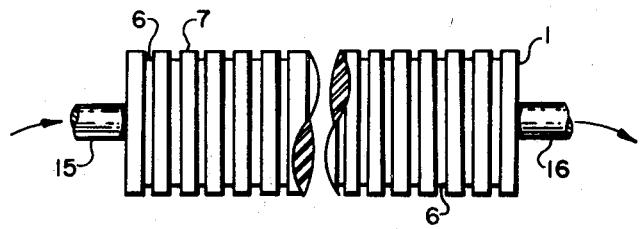
FIG. 2 is a view of the lateral surface of the cooled roll used in the embodiment of FIG. 1.

Referring now to FIG. 1, the edge of a continuous sheet of thermoplastic film 5 can be seen as it passes under guide roller 3, over cooled roll 1, and under guide roller 2. The film comes from feed roll 19 and is wound onto collector roll 18 after it leaves guide roller 2. The heat source in this embodiment is gas burner 4 and the flame from the burner plays directly on the film surface. The burner 4 is held by arm 20. Only the uncooled portion of the film 5 will be cut or melted. The selective cooling of the film 5 may be appreciated by reference to FIG. 2 where a view of the lateral surface of the cooled roll 1 is given. The film 5, as it passes over roll 1, contacts only the cooled surfaces 7 and this portion of the film is cooled rapidly enough by conduction of heat to the roll 1 to prevent cutting, burning, or melting. However, the portion of the film 5 that passes over the grooves 6 is not cooled as it does not directly contact roll 1 and the flame causes this portion of the film to melt and be severed into as many individual strands as there are cooled surfaces 7. For best results, the temperature of the roll 1 should be less than 80° F. Temperatures greater than 100° F. will cause sticking of the film to the roll.

Cooling of the roll 1 can be achieved by circulating air, water, or other coolant through the roll 1 where the coolant enters through inlet 15 and leaves through outlet 16. The inlet 15 and outlet 16 are part of the hollow roll axle 17 seen in FIG. 1. Tubing 21 enables the coolant to pass through the roll. Spray or evaporative cooling or other heat removal means can be employed in cooling roll 1 without departing from the scope of the invention.

Other heating means than gas burner 4 may be employed. For instance, a slitted heat shield through which flame is directed at the cooled film could be used, or high intensity energy deposition means such as lasers will heat the film sufficiently to effect severing. If a series of parallel laser beams are employed, cooling of the film will not be as necessary since the heat from the lasers would be very localized. Generally, local temperatures greater than 330° F. are necessary to melt and sever most thermoplastic film.

Figure 3:
FIG. 3 is a cross-sectional view of a single thermoplastic filament prepared according to the invention.

In FIG. 3 the cross-section of a filament 8 consisting of a single strand of thermoplastic film is shown. When the thermoplastic film is cut or melted by flame a bead 9 is formed on the cut edge. This bead reinforces and strengthens the edge of the film making it resistant to tearing. The resulting filament 8 can be twisted on a commercial twisting apparatus to produce a twisted yarn.

As it is produced the filament 8 can be stretched and oriented. This will thin the filament and result in a reduction in size of beads 9. To accomplish this, collector roll 18 in FIG. 1 can be run at a slightly greater rotational speed than feed roll 19 with the amount of stretching dependent upon the difference in speeds of the two rolls. Also, the collector roll 18 may instead be a beam for use in a loom and as the filament is directly wound on the beam the step of spooling the warp is eliminated in fabric weaving.

Figure 4:
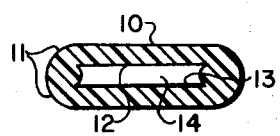
FIG. 4 is a cross-sectional view of a filament prepared from a double sheet of thermoplastic material according to the present invention.

FIG. 4 shows a tubular filament 10 made from two strands of film. Instead of a single sheet of film being passed over roll 1 as in FIG. 1, a double sheet is employed. When the flame cuts or melts the two sheets the beads 11 (FIG. 4) on the respective edges of the sheets fuse together resulting in a tubular structure. If a surface 12 or 13 of the sheet has been metallized then the surface will be enclosed and protected from scraping and wearing. Also, the space 14 defined by the two strands may be filled with coloring pigment or other decorative material. A functional material such as an electrically conductive or resistant substance may also be used to fill space 14.

Figure 5:
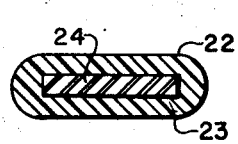
FIG. 5 is a cross-sectional view of a filament having an encapsulated metalized surface.

FIG. 5 illustrates a tubular filament made according to the present invention in which strands 22 and 23 encapsulate metallic surface coating 24. This has the appearance of a laminated filament. By using a stack of two or more sheets of film a laminated filament can be produced by the present invention. The films do not have to be of the same thermoplastic material but need only possess the trait of fusing together.

The present invention can be practiced with thermoplastic films in any thickness or width depending on the desired size of the filament. Also, any surface which has separable areas that can be cooled may be used in place of the rotatable roll. The surfaces must, of course, be separated transverse to the path of the film. For instance, a series of parallel surfaces having on their surfaces a thin film of water to cool the thermoplastic film could be used with the grooves that separate the surfaces serving a second purpose of carrying away excess water.

In one embodiment, heat-shrinkable biaxially oriented polypropylene film having a thickness of 0.0005 inch is employed to produce both single strands suitable for twisting and weaving and the tubular double strand having a protected metallized surface. For this embodiment the grooved roll shown in FIG. 2 was 6.5625 inches in diameter and 40 inches wide and made of aluminum for high heat transfer. The grooves 6 were 0.040 inch deep and 0.040 inch wide. The cooled surfaces 7 had widths of 1/16, 1/8, 1/4, 3/8, and 1/2 inch as filaments having widths in each of those sizes were desired. Production speeds of up to 200 feet per minute were obtained using air as a coolant for the roll. A Bunsen burner with a flame spreader was employed as the heat source. To achieve the higher production speeds greater gas pressure must be used for the burner 4 (FIG. 1), and for speeds greater than 200 feet per minute liquid cooling is preferable for the roll 1. In the case of the 0.0005 inch film, filaments 8 as shown in FIG. 3 will have a bead 9 up to 0.030 inch in thickness. The beads usually range from 3 to 7 times the thickness of the film. The size of the bead is dependent upon the width of the groove; the wider the groove, the larger the bead.

To produce a filament as shown in FIG. 4 two sheets of heat-shrinkable biaxially oriented polypropylene film were used. In this embodiment both sheets of film were approximately 0.0005 inch in thickness but the surface of one of the two sheets was metallized with aluminum. Using the method of the present invention a filament was thus produced having a totally encapsulated metallized surface.

The above described embodiments were set forth merely as illustrations of the present invention and do not limit it. The scope of the invention is limited only by the following claims.

I claim:

1. A method for preparing tubular filaments from thermoplastic polymeric film comprising:
   (a) assembling a stack of a plurality of sheets of said film;
   (b) selectively cooling continuous, parallel strips on said stack; and
   (c) simultaneously applying heat while said sheets are being selectively cooled, said heat being sufficient to melt the uncooled portions of the sheets whereby the sheets are severed and are fused together along their severed edges forming tubular filaments.

2. The method of claim 1 wherein the selective cooling is accomplished by:
   (i) providing a plurality of cooled surfaces separated by parallel grooves and
   (ii) passing a stacked plurality of said sheets over said cooled surfaces whereby upon application of heat the portions of the sheets passing over the grooves are severed and fused together along their severed edges thus forming tubular filaments.

3. The method of claim 2 wherein a double sheet of film is passed over said surfaces thereby forming tubular thermoplastic filaments upon application of heat.

4. The method of claim 1 wherein the application of heat is by flame.

5. The method of claim 2 wherein the plurality of cooled surfaces and parallel grooves are circumferentially located on a cooled roll and said sheets are passed continuously thereover.

References Cited
UNITED STATES PATENTS

| | | | |
|---|---|---|---|
| 3,394,211 | 7/1968 | MacDuff | 264—154 |
| 2,614,288 | 10/1952 | Shavannes | 264—147 |
| 2,488,212 | 11/1949 | Lloyd, Jr. | 156—82 |
| 2,627,213 | 2/1953 | Nye | 156—251 |
| 2,474,035 | 6/1949 | Crandon | 156—497 |
| 2,728,950 | 1/1956 | Annesser | 264—147 |
| 2,398,398 | 4/1946 | Abbott | 156—497 |

DOUGLAS J. DRUMMOND, Primary Examiner

F. FRISENDA, Assistant Examiner

U.S. Cl. X.R.

156—282, 290